United States Patent Office 3,502,764
Patented Mar. 24, 1970

3,502,764
ORIENTED BLENDS OF ETHYLENE POLYMERS AND PETROLEUM WAXES AND PROCESS FOR PREPARING SAME
John P. Tordella, Wilmington, Del., assignor to E. I. du Pont de Nemours and Company, Wilmington, Del., a corporation of Delaware
No Drawing. Filed May 31, 1966, Ser. No. 553,631
Int. Cl. D01f 7/02; C08f 3/04
U.S. Cl. 264—210     6 Claims

ABSTRACT OF THE DISCLOSURE

This invention relates to novel polymeric products and a process for preparing such products. More particularly, the invention relates to oriented, self-supporting polymeric structures comprising blends of ethylenic polymers and petroleum wax and a process for orienting such structures.

BACKGROUND OF THE INVENTION

Orientation of films and filaments and the attendant increase in strength properties is well known. In the drawing process, it is the usual practice to raise the temperature during the drawing step. However, a much greater degree of orientation is induced by drawing at temperatures below the melting point of the composition comprising the article to be drawn than above. If the polymeric material has a fairly definite melting point, no substantial problems are encountered. This may not be true, however, in the case of blends of two or more components having significantly different melting points. Substantial orientation of the lower melting components is not usually obtained at draw temperatures above their respective melting temperatures.

DESCRIPTION OF THE INVENTION

Surprisingly, it has been found that by the process of this invention oriented structures comprised of ethylenic polymers blended with petroleum wax can be prepared which exhibit substantial orientation of both components of the blend.

In accordance with this invention, these oriented structures are provided by first forming a shaped article of a homogeneous polymer-wax blend, heating the shaped article to a temperature above the melting point of the wax but below the melting point of the polymeric component and then drawing the article while the wax is still in the molten state. Thereafter, the drawn article is cooled to room temperature. Quite unexpectedly, the drawn article produced shows (by characteristic X-ray patterns) molecular orientation in the direction of drawing of both components even though the structure has been drawn at a temperature at which the wax is molten and unoriented. Drawing increases the tensile strength of the article, and whereas only limited drawing can be accomplished at temperatures below the melting point of the wax, very large amounts of draw can be effected by following the teaching of this invention.

In practicing this invention, the components from which the article is prepared are so selected that the difference between the melting point of the polymer and the wax is at least 10° C. Generally the difference in melting point will not be greater than about 90° C., however, the ultimate limiting factor will be the temperature at which the wax would be degraded by heating to the selected drawing temperature. This difference in melting points is referred to herein as the "temperature interval." Melting points are defined herein as the temperatures at the maximum temperature difference between the wax or polymer specimen and an inert reference material when both are heated in a differential thermal analyzer in accordance with the procedures described by B. Ke in "Organic Analysis" volume 4, Interscience, New York (1960). These peak temperatures are somewhat lower than the temperature at which all crystallinity disappears. Relative to waxes, the melting point is the peak temperature relative to the disappearance of the highest melting crystalline phase versus the peak which may accompany a lower temperature crystalline phase change.

The polymeric components useful in this invention are known polymers and copolymers of ethylene of moderate to high molecular weight, i.e., having a melt index of less than 10 and preferably from about 0.001 to 1. The polymers exhibit ethylenic crystallinity (as determined by standard X-ray diffraction techniques) and generally contain at least 80 mole percent of ethylene. In addition to ethylene homopolymer, copolymers containing up to 20 mole percent of any monomer containing $\alpha$-olefinic unsaturation capable of copolymerizing with ethylene to provide products which have a suitable melt index, contain residual ethylenic crystallinity, and are miscible in the wax component are satisfactory. Among the wide variety of comonomers are vinyl acetate, alkyl acrylates, $\alpha$-olefins having from three to eight carbon atoms and unconjugated diolefins having five to eight carbon atoms. Blends of two or more of the polymers may be used.

The wax component of the blend is selected from paraffin, semi-microcrystalline and microcrystalline waxes or blends thereof and will be referred to herein as petroleum waxes. Paraffin wax is a mixture of solid hydrocarbons derived from the overhead wax distillate fraction obtained from the fractional distillation of petroleum. It is a hard, translucent, usually colorless material having a melting point of about 125 to 175° F. Microcrystalline wax is obtained from the nondistillable still residues from the fractional distillation of petroleum. It differs from paraffin wax in that it contains significant quantities of branched and cyclic hydrocarbons. The microcrystalline wax may be considerably more plastic than paraffin wax. The semi-microcrystalline waxes have properties which generally fall in a range between those of the paraffin and microcrystalline waxes. A single wax or blend of two or more waxes melting between about 50° C. and 80° C. may be used in preparing the polymer-wax blends. The waxes must, of course, blend, i.e., be miscible with the polymer at temperatures above its melting point.

The polymer-wax blends may be prepared by known processes. Blending may be accomplished by heating and stirring the components or by mixing in heavy duty mixers such as rubber rolls, sigma blade mixers or screw extruders. In preparing the blend from about 10% to 50% by weight of the polymer is used with about 90% to 50% by weight of the wax. Generally, 20% to 40% by weight of polymer is used. The amount of polymer required to provide a given degree of orientation in the final article decreases as the melt index of the polymer is decreased. Minor amounts of other ingredients such as stabilizers, pigments and fillers may be included in the blends.

Shaped structures comprised of the copolymers-wax blends may be prepared by well known extrusion and molding techniques. The shaped articles are then drawn in accordance with this invention two or more times their original unit length. Drawing may be mono- or biaxial. Biaxial drawing may be accomplished by widening a sheet continuously while stretching longitudinally, by expanding a tube while drawing it axially or by molding operations wherein the area of a film or sheet of the blended components is increased by extension. The drawing must, of course, be carried out within the aforementioned temperature limitations.

This invention will be further illustrated by the following examples in which parts and percentages given are by weight unless otherwise specified.

EXAMPLES

In the following examples polymer-wax blends of the specified ingredients are prepared by stirring the polymer and wax in a beaker heated on a hot plate at about 300° F. until partial solution is achieved. Final mixing is accomplished using a heated (about 300° F.) two roll mill. Films about 1/32 inch thick of the blend are formed by compression molding. The films are drawn at the temperatures indicated in the table which follows. The melt index of samples is determined by ASTM D 1238–57T using a temperature of 190° C. and load of 2160 grams. Each of the polymers exhibited typical ethylenic crystallinity as determined by standard X-ray diffraction techniques.

TABLE

| | Polymer | | | Wax | | Blend, Polymer/ Wax (wt. percent) | Unoriented Film, Tensile Strength at Break [8] (p.s.i.) | Data for Oriented Film | | | | |
|---|---|---|---|---|---|---|---|---|---|---|---|---|
| | | | | | | | | Orientation Conditions | | | Tensile Strength at Break [8] (p.s.i.) | Elongation (percent) |
| Example No. | Type | Melt Index | M.P. (°C.) | Type | M.P. (°C.) | | | Temp. (°C.) | Draw Ratio [9] | | | |
| | | | | | | | | | Uniaxial | Biaxial | | |
| 1 | E/P [1] | 0.008 | 118 | A [2] | | 40–60 | 917 | 85 | 12 | | 2,752 | 117 |
| 2 | E/P [3] | 0.001 | 119 | A | | 40–60 | 1,186 | 85 | 10.5 | | 4,433 | 155 |
| 3 | E/HD [4] | 0.004 | 103 | A | | 30–70 | | 85 | 6 | | 2,631 | 216 |
| 4 | E/H-1 [5] | 1.4 | 90 | A | | 40–60 | 1,486 | 65 | 13.3 | | 2,892 | 230 |
| 5 | E [6] | 0.02 | 134 | B [7] | | 40–60 | 1,334 | 120 | | 13 | 24,000 | 8 |
| 6 | E | 0.02 | 134 | A | | 20–80 | 625 | 120 | | 13.3 | 2,800 | 164 |
| 7 | E | 0.02 | 134 | A | | 30–70 | 1,036 | 115 | 2.6 | | 1,244 | 875 |
| 8 | E | 0.02 | 134 | A | | 30–70 | 1,036 | 120 | 10.4 | | 4,227 | 143 |
| 9 | E | 0.02 | 134 | A | | 30–70 | 1,036 | 115 | 28.2 | | 6,075 | 158 |
| 10 | E | 0.02 | 134 | A | | 40–60 | 1,388 | 115 | 2.9 | | 2,110 | 460 |
| 11 | E | 0.02 | 134 | A | | 40–60 | 1,388 | 115 | 8.1 | | 6,000 | 225 |
| 12 | E | 0.02 | 134 | A | | 40–60 | 1,388 | 115 | 28.2 | | 12,250 | 130 |

[1] Ethylene/propylene copolymer containing 21% by weight propylene.
[2] "Aristowax" 143–150, Witco Chemical Co.'s paraffin wax.
[3] Ethylene/propylene copolymer containing 17.5% by weight propylene.
[4] Ethylene/hexadiene-1,4 copolymer containing 13% by weight hexadiene-1,4.
[5] Ethylene/hexene-1 copolymer containing 11 mole percent hexene-1.
[6] Ethylene polymer containing 0.5% by weight (maximum) butene-1.
[7] "Sunoco" microcrystalline wax.
[8] Tensile strength at break—tensile loads per unit of area of minimum original cross-section at the moment of rupture of the test specimen (ASTM D638).
[9] Ratio of thickness of film before to that after drawing.

The drawn samples are each examined by the usual X-ray techniques to determine the extent of orientation of the blend components. In all cases the drawn article shows (by characteristic X-ray patterns) molecular orientation in the direction of drawing of both components even though the article is drawn at a temperature at which the wax is molten and unoriented.

It will be apparent from the foregoing examples that products prepared according to this invention exhibit greatly increased tensile strength with considerable elongation prior to rupture. The strength increases with increasing amount of polymeric component and with increasing draw. An unexpected advantage resides in bonding films of this invention to themselves or to other materials such as paper, aluminum, iron and glass by simply heating the oriented structure to a temperature within the temperature interval. The products of this invention also exhibit good energy absorption on impact. They are also useful in applications where shrinkage of a film is desired since the unrestrained film shrink when heated above the melting point of the wax component.

Since many different embodiments of this invention may be made without departing from the spirit and scope hereof, it is to be understood that the invention is not limited by the specific illustrations except to the extent defined in the following claims.

What is claimed is:

1. A process for preparing an oriented article which shows by characteristic X-ray patterns molecular orientation in the direction of drawing which comprises blending from about 10% to 50% by weight of an orientable ethylene polymer having a melt index of less than 10 with from about 90% to 50% by weight of petroleum wax, said polymer and said wax having a temperature interval of at least 10° C., forming a shaped article from said blend, heating said shaped article to a temperature above the melting point of said wax but below the melting point of said polymer until said wax becomes molten, drawing said shaped article while the wax is in the molten state at least two times its original unit length or area and thereafter cooling the drawn article to room temperature.

2. The process of claim 1 wherein said polymer has a melt index from about 0.001 to 1, said polymer is present in said blend in an amount from about 20% to 40% by weight, and said wax is a petroleum wax having a melting point from about 50° C. to 80° C.

3. A process according to claim 1 wherein the melt index of said polymer is from 0.001 to 1, said polymer is present in an amount from about 20% to 40% by weight and the temperature interval is from 10° C. to 90° C.

4. A process according to claim 3 wherein said polymer is polyethylene having a melting point of about 134° C. and a melt index of about 0.02 and said wax is paraffin wax having a melting point of about 64° C.

5. A process according to claim 1 wherein said polymer is an ethylene copolymer containing up to 20% by weight of a copolymerized ethylenically unsaturated monomer.

6. A process according to claim 5 wherein said monomer is selected from the group consisting of vinyl acetate, alkyl acrylates, α-olefins having from three to eight carbon atoms and unconjugated diolefins having five to eight carbon atoms.

References Cited

UNITED STATES PATENTS

| 3,376,244 | 4/1968 | Rundle. | |
|---|---|---|---|
| 2,920,349 | 1/1960 | White. | |
| 3,210,305 | 10/1965 | Coenen | 260—285 |
| 3,243,396 | 3/1966 | Hammer. | |
| 2,980,964 | 4/1961 | Dilke. | |
| 3,182,033 | 5/1965 | Gregorian. | |
| 3,261,903 | 7/1966 | Carr | 264—210 |
| 3,299,194 | 1/1967 | Golike | 264—210 |
| 3,223,764 | 12/1965 | Kahn | 264—210 |

FOREIGN PATENTS 937,807   9/1963   Great Britain.

MORRIS LIEBMAN, Primary Examiner

P. R. MICHL, Assistant Examiner

U.S. Cl. X.R.

260—28.5